Nov. 28, 1944.   W. E. PARKER   2,363,744
SPOOL
Filed Nov. 18, 1943
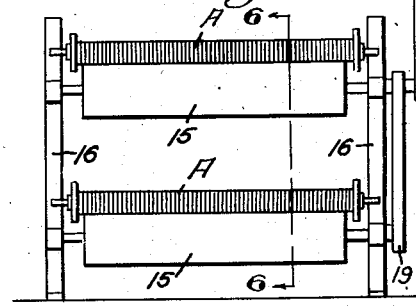
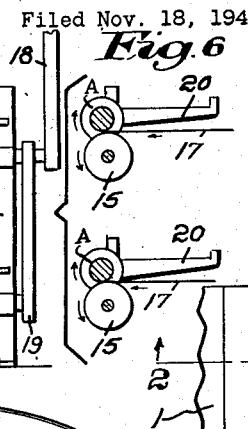
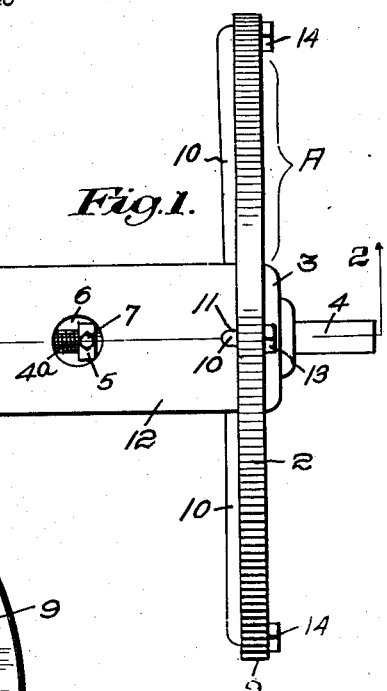
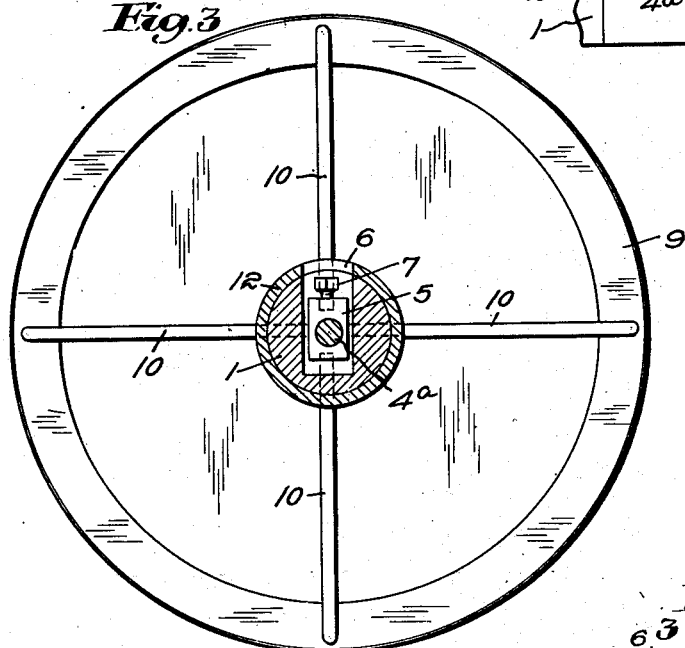
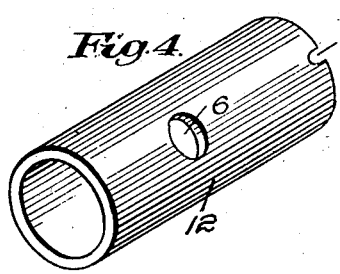
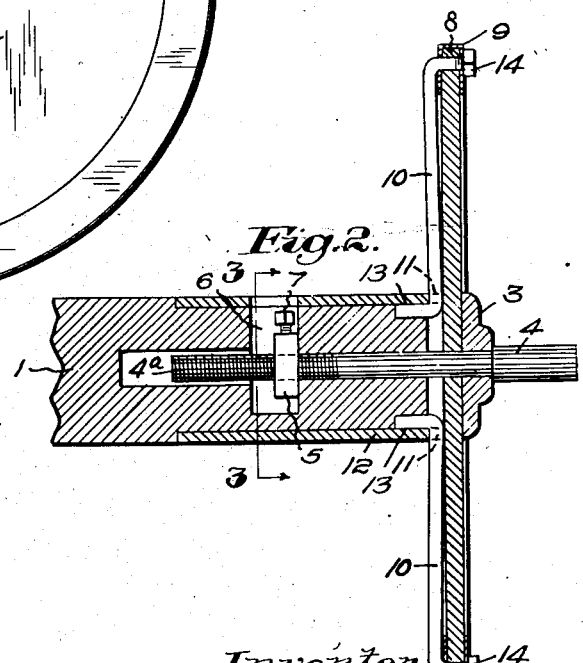
Inventor.
Walter E. Parker,
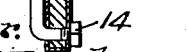
Attys.

Patented Nov. 28, 1944

2,363,744

UNITED STATES PATENT OFFICE 2,363,744

SPOOL

Walter E. Parker, Haverhill, Mass.

Application November 18, 1943, Serial No. 510,726

6 Claims. (Cl. 242—124)

This invention relates to spools for thread, twine and the like and used for many purposes, more especially for receiving the yarn on carding machines, and delivering the yarn to be spun in spinning machines and the like for either wool or cotton.

Spools may be of any size for the above use and are usually large, as from two feet to five feet long and the spool heads frequently are twelve inches in diameter.

The present custom is to make the spool heads of light wood or metal, and in use, when removed from the spinning machines in mills, the spools are frequently subjected to rough handling which results in the presence of cracks at the junction of the spool shank and its heads and also the spool heads bruised about the edge and elsewhere, in which the thread catches and usually is broken, entailing loss of both time and thread, and that difficulty it is one aim of my invention to avoid.

In the drawing of my novel spool:

Fig. 1 is a side or edge view of the spool, with the shank partly broken away;

Fig. 2 is a vertical section on the line 2—2, Fig. 1;

Fig. 3, an end and vertical sectional view on line 3—3, Fig. 2;

Fig. 4, a perspective of the sleeve on the end of the shank;

Fig. 5, a partial elevation of that portion of a commercial spinning or carding machine which supports the spool and spool rotating and winding cylinder and operating connections; and Fig. 6, a vertical cross-section on line 6—6 of Fig. 5.

Referring first to Figs. 1 and 2, it will appear that my novel spool A comprises a shank 1, with a head 2 at each end, one only being shown for convenience. The shank is preferably of wood and the heads may be of any suitable material, usually of metal or wood, but I prefer fibreboard of wood or paper, or like material, as being less likely to be damaged by the usual rough usage to which the spools are subjected. Such usage of conventional spools always, sooner or later, results in damage to the edges of the heads either by bending or splitting them or by developing a crank at the joint of the shank and head.

The head 2, Figs. 1, 2, is supported partially against the end of the shank by a circular washer-like disk 3 on an axial rod 4, and by which the head 2 is held tightly against the shank end. The rod 4 extends any suitable distance into the shank 1 and is threaded on its inner end 4a to receive a nut 5 thereon in a diametrical slot or passage 6 in the shank and which nut may be locked in position on the rod by a lock screw 7 through the open end of the slot 6.

It is obviously very desirable to avoid the constant damaging of the spool heads which involves much trouble and expense. To avoid the danger of damage to and from the rough edges of or the cracks in the heads 2 as commonly made, in my novel spool, Fig. 2, the outer edge 8 of each head is protected by a metal or other suitable channel-shaped member 9, Fig. 2, and which channel member is held in position tightly against the head edge by being spun thereon and also locked thereon by thread guiding and protecting rods 10, preferably of metal. The rods 10 also have a further and more important function, to be described, and the lower ends of the rods 10 pass through slots 11 in the sleeve end 12, preferably of fibre, and the rod ends then are bent laterally so as to extend axially and fit tightly and securely in longitudinal slots 13 in the shank end. Such rods 10 are held in place by the axial rod 4, washer 3, head 2 and nuts 5. The thread guiding rods 10 extend radially outwardly against the inner faces of the heads 2 and terminate in axially extending portions passing through the channel member 9 and the head 2 where they are secured by nuts 14.

The further and important function of the rod 10 is to guide the thread as it is wound upon the spool to keep the thread from falling into any slot or space between the head 2 and shank end where they meet and which is a very common and serious cause of trouble. Hence there can be no cracks or open space in the joint where the head contacts the shank, nor diametrical or other cracks in the heads 2, nor rough edges on the heads to injure and break the threads. This is impossible because, the slots 11 being curved at their inner ends or walls, no straight space is provided where any thread can fall into it, even by accident.

When the yarn is to be wound on the spool, or from one spool to another for further spinning, the spool A, Fig. 6, is placed above and in contact with a cylinder 15 in the frame 16 of the machine and the yarn or thread 17 is wound on the spool A in parallel loops between the rods 10 on opposite spool ends by the rotating cylinder which is in surface contact therewith and rotated by belts 18, 19. When the spool is full it is rolled onto the arms 20 by the operator and a new spool placed over the cylinder 15. There may be any number of spools in the machine.

If the thread on the spool is caught at any time either in the joint of the shank and head or in a rough edge or crack in the head, a portion of the thread is lost and expense through lost time is incurred, but this cannot happen with my novel spool because the thread guiding rods 10 prevent the thread from falling into any crack should it by any chance exist at the joint of the shank and head.

By the use of my novel and improved spool the above difficulties are avoided.

My invention is not limited to the precise construction shown herein, but may be modified in many details, without departing from the spirit of the claims, and within the scope thereof.

I claim:

1. A spool for thread and the like comprising a shank, heads therefor and thread guiding rods, said rods extending radially outward from said shank and adjacent the inner faces of the heads and terminating adjacent said shank in axially extending portions.

2. A spool for thread and the like comprising a shank, heads therefor and thread guiding rods, said rods extending radially outward from said shank adjacent the inner faces of the heads and terminating adjacent said shank in axially extending portions, there being a sleeve adjacent each head, surrounding the shank and the axially extending portions of said thread guiding rods.

3. A spool for thread and the like comprising a shank, heads therefor and thread guiding rods, said rods extending radially outward from said shank adjacent the inner faces of the heads and terminating adjacent said shank in axially extending portions, each of said heads having a circular channel shaped protective member mounted upon its peripheral edge.

4. A spool for thread and the like comprising a shank, heads therefor and thread guiding rods, said rods extending radially outward from said shank adjacent the inner faces of the heads and terminating adjacent said shank in axially extending portions, each of said heads having a circular channel shaped protective member mounted upon its peripheral edge, said thread guiding rods at their outer ends extending through one of said channel shaped protective members.

5. A spool for thread and the like comprising a shank, heads therefor and thread guiding rods, said rods extending radially outward from said shank adjacent the inner faces of the heads and terminating adjacent said shank in axially extending portions, there being a sleeve adjacent each head, surrounding the shank and the axially extending portions of said thread guiding rods, each of said sleeves having recesses therein to permit said sleeves to closely embrace said thread guiding rods and to contact said heads in the portions lying between said rods.

6. A spool for thread and the like comprising a shank, heads therefor and thread guiding rods, said rods extending radially outward from said shank adjacent the inner faces of the heads and terminating adjacent said shank in axially extending portions, there being a sleeve adjacent each head, surrounding the shank and the axially extending portions of said thread guiding rods, each of said heads having a circular channel shaped protective member mounted upon its peripheral edge, said thread guiding rods at their outer ends extending through one of said channel shaped protective members.

WALTER E. PARKER.